3,065,093
NOVEL PIGMENT COMPOSITIONS
Gregor Berstein, Newton Center, and Willard F. Roemelt, Concord, Mass.
No Drawing. Filed Apr. 7, 1959, Ser. No. 804,580
9 Claims. (Cl. 106—253)

This invention relates to pigment compositions and in particular to improved oil base or oil containing titanium dioxide pigment compositions.

As is well known, anatase titanium dioxide pigments possess a lower refractive index and, therefore, exhibit lower tinting strength and produce lower opacity in protective coatings at a given concentration than do rutile titanium dioxide pigments. Accordingly, it is in general economically disadvantageous to use anatase pigments except in special cases when properties other than opacity and tinting strength are of importance, because larger quantities of anatase pigment are required to obtain a desired opacity value. Such a special case arises, however, in various paint formulations destined for exterior use where the higher photochemical reactivity of anatase leads to increased chalking and "self-cleaning." Rutile pigments not only do not normally exhibit this chalking effect to a desirable degree but, moreover, under certain exposure conditions, produce a strong yellowish discoloration. Accordingly, even in cases where the limited chalking capabilities of rutile do not prevent its use in protective coating formulations, it is often necessary to add to the formulations at least about 30% of anatase so that the anatase-type (non-yellowing) chalking capabilities of the pigment formulation will be sufficiently high to overcome the undesirable discoloration produced by rutile.

In accordance with the present invention, novel titanium dioxide pigment compositions were discovered which exhibit to a surprising degree the desirable chalking effects of anatase pigments.

Accordingly, it is a principal object of the present invention to provide improved titanium dioxide pigment compositions.

Another object of the present invention is to provide a composition composed predominantly of rutile but exhibiting excellent anatase-type (non-yellowing) chalking capabilities.

Another object of the present invention is to provide pigment compositions which exhibit the desirable chalking effects of anatase but which preserve the economic advantages normally obtained by the use of rutile.

Other objects of this invention will in part be obvious and will in part appear hereinafter.

In accordance with the present invention, it was discovered that if a small portion of anatase of abnormally fine particle size, that is having a particle size of less than about 200 millimicrons, is included in a predominantly rutile formulation, the chalking properties of the pigment formulation are enormously improved. This is a remarkable and totally unexpected result.

Although we do not wish to be held to this theory or explanation, we postulate that the improved chalking properties of the compositions of this invention are due to the increased amount of anatase surface area available therein, since the particle size of the anatase of the present invention is substantially smaller than that of standard commercial grades of anatase pigments, which run about 250 to 400 millimicrons in particle size.

There is no critical limitation of the proportions in which the extra fine anatase titanium dioxide can be utilized according to this invention. We have found that the smaller the particle size of the anatase, the smaller is the quantity of said pigment required to achieve a given level of chalking in a given paint formulation. Accordingly, it is recommended that the extra fine anatase be used in amounts not greater than about 25% by weight of the total titanium dioxide pigment content of the formulation in question. Quantities larger than about 25% can be utilized if desired but offer little additional technical gain and become increasingly disadvantageous commercially.

The method by which the extremely fine anatase may be produced is not critical. Anatase having an average particle size of less than 200 millimicrons is currently produced by flame hydrolysis of volatile titanium halides, such as $TiCl_4$. Suitable processes for this reaction have been disclosed, for example, by Stokes and Kistiakowsky in copending U.S. application No. 129,089 filed January 23, 1949, and by Wagner in U.S. applications Nos. 344,840 and 455,369, filed March 26, 1953, and September 10, 1954, respectively.

Other methods of producing the extremely finely-divided anatase for the practice of the present invention comprise reacting vaporized chlorides of titanium (a) with superheated steam or (b) in a hydrogen flame, or (c) in a hydrogen flame with excess air or oxyen. These methods are disclosed by Gosta Flemmert in "Studies on Inorganic Fillers," published in 1953 by Dalarnes Tidnings- och Boktryckeri-AB in Hedemora, Sweden.

Also, predominantly anatase titanium dioxide produced by other processes such as by precipitation from aqueous media, for example, from an aqueous solution of ilmenite, would be suitable for the purposes of the present invention, provided it is equally fine in particle size.

The present invention is applicable to all oil base and oil containing paint formulations containing titanium doxide pigments. Typical oil base and oil containing paint formulations include alkyd resin base paints, oil modified latex paints and paints containing treated oils.

In addition to titanium dioxide pigments, the protective coating formulations of the present invention may include any other ingredients normally utilized in paint formulations, for example, other pigments and extenders such as lead and zinc pigments, clay, calcium carbonate and siliceous extenders such as wollastonite, silicas and talc, drying oils such as linseed oil, soybean oil, dehydrated castor oil, fish oil, tung oil, and treated drying and semi-drying oils, solvents such as mineral spirits and petroleum solvents in general, driers such as lead, cobalt and manganese, and fungicides such as phenyl mercury oleate.

Hereinafter follows a non-limiting illustrative example.

*Example 1*

Four identical vehicle formulations were made up, each formulation comprising 556 g. of bodied linseed oil having a viscosity of Z as measured by the Gardner-Holdt viscosity test, 152 g. of mineral spirits, 10 g. of 24% lead naphthanate drier, 2 g. of 6% Mn naphthanate drier, 0.2 g. of 6% Co naphthanate drier. To each of the formulations were added various amounts of commercial and extra fine titanium dioxide pigments as indicated below:

| Formulation | A | B | C | D |
|---|---|---|---|---|
| Titanox RANC—a Commercial Rutile produced by Titanium Pigments Corp. | 250 | 250 | 250 | 250 |
| Anatase $TiO_2$—produced by Du Pont (Average particle size: about 300 millimicrons) | | 50 | | |
| Pyrogenic $TiO_2$—produced by Deutsche Gold- Und Silber-Scheideanstalt Vormals Roessler (DEGUSSA) (average particle size: about 100 millimicrons) | | | 50 | |
| Pyrogenic $TiO_2$—produced by DEGUSSA (average particle size: about 25-30 millimicrons) | | | | 50 |

In addition, to each of the formulations was added from 1.8% to 1.93% by weight of the formulation of a green tint, consisting of 100 grams of Monastral Green No. GT-751-D produced by Du Pont and 300 grams of bodied linseed oil, so that all the formulations would have approximately the same initial brightness value.

The formulations were applied to standard red cedar wood panels so as to give complete opacity. The panels were then exposed in an Atlas Weather-Ometer for 96 hours. It should be pointed out that subsequent to the Weather-Ometer treatment, visual differences between runs B, and C and D were readily apparant, runs C and D appearing considerably more faded than run B.

The panels were then subjected to the "chalk fade" test which is used in the paint industry for indicating comparative results. A reading of 10 indicates substantially no chalk formation. A reading of zero indicates a high or maximum degree of chalk formation. Intermediate values indicate varying degrees of chalk formation. The results are set forth below:

| Runs | A | B | C | D |
|---|---|---|---|---|
| Chalk Fade Reading | 10 | 9-10 | 8 | 4-5 |

In accordance with the present invention, it was additionally discovered that the addition of extra fine anatase to a conventional rutile protective coating formulation generally increased opacity. This result is remarkable and completely unexpected, since the extremely fine particle size anatase pigments are too fine to produce any opacity in the paint films themselves but result in completely transparent films when utilized alone.

From the completely unexpected results achieved we postulate that the extremely fine particle size anatase also has a dispersing effect upon standard commercial sized rutile pigments, thereby producing better particle spacing and consequently better light scattering.

At any rate, the remarkable results achieved by the practice of the present invention are commercially most beneficial; it is now possible to replace a portion of the rutile pigment in a paint formulation with the extra fine titanium dioxide according to the present invention and thereby not only enormously increase the chalking properties of the paint formulation but also maintain its opacity.

There follow a number of non-limiting illustrative examples.

Example 2

An enamel formulation comprising 750 g. of "Aroplaz," 1085-M-50, a 50% non-volatile alkyd resin, produced by Archer-Daniels Midland Company, 275 g. of TT-T425A-Grade II rutile titanium dioxide, a standard, commercial grade, chalk-resistant, rutile pigment, 143 g. of mineral spirits, 5.3 g. of a 24% lead naphthanate drier and 2.3 g. of a 6% cobalt naphthanate drier, was premixed and ground on a three-roll mill to enamel fineness. The opacity of the formulation at a 535 ft.²/gal. spreading rate (corresponding to a film thickness of about 3 mils) was found to be 97%.

Example 3

This enamel formulation was an exact duplicate of the formulation of Example 2, except that only 250 g. of the rutile titanium dioxide pigment were added instead of 275 g. as in Example 1, the remaining 25 g. being replaced by 25 g. of anatase titanium dioxide having an average particle size of 20-40 millimicrons. Thus the titanium dioxide pigment mixture comprised 250 g. of rutile titanium dioxide and 25 g. of finely divided anatase or about 9% anatase by weight. On the basis of the total weight of the eneamel said anatase comprised about 2% by weight. The opacity of this formulation measured in the same way as in Example 1 was 97%.

In one embodiment of the present invention, a standard substantially non-chalking, rutile-containing, paint formulation is treated with a "chalk paste" to produce a paint possessing specifically desired chalking properties. It should be pointed out that for the purposes of the present invention, rutile paint formulations in general are considered to be substantially non-chalking.

The chalk paste is produced by dispersing the extra fine anatase pigment in a paint vehicle or binder which is compatible with the rutile paint formulation to be treated. Those vehicles or binders such as linseed oil or soybean oil which are commonly utilized in oil-containing titanium dioxide paints are completely suitable for use as the vehicle for the chalk paste. Of course, it is preferred that the vehicle or binder utilized in producing the chalk paste be the same as that utilized in the rutile paint formulation. Although the proportions of extra fine anatase to vehicle in said chalk paste may vary over a wide range, a one to one weight ratio is convenient to use.

The paint formulation possessing the desired chalking properties is produced by the simple expedient of adding portions of this chalk paste to said substantially non-chalking titanium dioxide-containing paint formulation. Accordingly, the chalk paste of the present invention constitutes a major advance in the art in that it allows a single base paint (the substantially non-chalking paint) to be utilized in the preparation of both white and colored paint formulations. If a colored paint is desired, all that is required is that tint paste or a tint formulation of some type, which are well known commercially, be added to the substantially non-chalking base. If a white paint is desired, all that is required is that the chalk paste of the present invention be added to the same non-chalking base paint. Such convenience was not heretofore possible because a substantially non-chalking base paint could not previously be transformed into chalking paint without entailing prohibitive cost.

Obviously, many changes may be made in the description and examples without departing from the scope of the invention. For example, although only pure extra fine anatase has been specifically mentioned above, blends of extra fine anatase and extra fine rutile can equally well be utilized in practicing the present invention. Clearly, however, the total quantity of such a blend necessary to produce a desired level of chalking is dependent upon the concentration of the anastase pigment present in the blend. Accordingly, it is intended that the disclosure of specific materials be regarded as illustrative and as in no way limiting the scope of the invention.

What we claim is:

1. A titanium dioxide pigment formulation having an improved combination of chalking properties and opacity consisting essentially of opacity grade rutile titanium dioxide and anatase titanium dioxide having an average particle size of no more than about 100 millimicrons, said anatase titanium dioxide being present in quantities sufficient to effect a measurable increase in the chalking properties of said formulation but less than about 25% by weight of said formulation.

2. The pigment formulation of claim 1 wherein said anatase titanium dioxide comprises between about 9% and about 25% by weight of said formulation.

3. A chalk paste for addition to an oil-base, rutile titanium dioxide-containing protective coating formulation to impart improved chalking properties thereto which consists essentially of an oil base vehicle and anatase titanium dioxide having an average particle size of less than about 100 millimicrons.

4. The chalk paste of claim 3 wherein the ratio of said vehicle to said anatase titanium dioxide is about 1:1 by weight.

5. A paint having improved chalking properties and unexpectedly improved opacity comprising an oil base vehicle, opacity grade rutile titanium dioxide and anatase titanium dioxide having an average particle size of less than about 100 millimicrons, said anatase titanium dioxide being present in quantities sufficient to effect a measurable increase in the chalking properties of said paint but less than about 25% by weight of the total titanium dioxide content of said paint.

6. The paint of claim 5 wherein said anatase titanium dioxide comprises between about 2% and about 25% by weight of the total weight of the total titanium dioxide content of said paint.

7. A titanium dioxide pigment formulation having a unique combination of chalking properties and opacity consisting essentially of opacity grade rutile titanium dioxide and anatase titanium dioxide having an average particle size of between about 20 and about 40 millimicrons, said anatase titanium dioxide being present in quantities sufficient to effect a measurable increase in the chalking properties of said formulation but less than about 25% by weight of said formulation.

8. The pigment formulation of claim 7 wherein said anatase titanium dioxide comprises between about 9% and about 25% by weight of said formulation.

9. The chalk paste of claim 3 wherein said anatase titanium dioxide has an average particle size of between 20 and about 40 millimicrons.

References Cited in the file of this patent
UNITED STATES PATENTS

| | | |
|---|---|---|
| 1,795,467 | Blumenfeld | Mar. 10, 1931 |
| 1,816,388 | Mittasch et al. | July 28, 1931 |
| 2,273,431 | Booge | Feb. 17, 1942 |
| 2,333,948 | Muskat | Nov. 9, 1943 |
| 2,340,610 | Muskat et al. | Feb. 1, 1944 |
| 2,818,344 | Buckman | Dec. 31, 1957 |

OTHER REFERENCES

"Titanox Pigments," Titanium Pigment Corp., TP-20M-12-49, pages, 42, 49 and 50.